(12) United States Patent
Harper et al.

(10) Patent No.: US 11,687,734 B2
(45) Date of Patent: Jun. 27, 2023

(54) SYSTEMS AND METHODS TO EXTRACT THE CONTEXT OF SCIENTIFIC MEASUREMENTS USING TARGETED QUESTION ANSWERING

(71) Applicant: Elsevier, Inc, New York, NY (US)

(72) Inventors: Corey A. Harper, Brooklyn, NY (US); Jessica Rose Cox, Williston Park, NY (US); Antony Jason Scerri, Worcester Park (GB); Ronald E. Daniel, Jr., Concord, CA (US)

(73) Assignee: ELSEVIER, INC., New York, NY (US)

( * ) Notice: Subject to any disclaimer, the term of this patent is extended or adjusted under 35 U.S.C. 154(b) by 441 days.

(21) Appl. No.: 16/919,713

(22) Filed: Jul. 2, 2020

(65) Prior Publication Data

US 2021/0004540 A1 Jan. 7, 2021

Related U.S. Application Data

(60) Provisional application No. 62/870,951, filed on Jul. 5, 2019.

(51) Int. Cl.
*G06F 40/40* (2020.01)
*G06F 16/332* (2019.01)
(Continued)

(52) U.S. Cl.
CPC ............ *G06F 40/40* (2020.01); *G06F 16/313* (2019.01); *G06F 16/3329* (2019.01); *G06F 16/3344* (2019.01); *G06F 16/3347* (2019.01)

(58) Field of Classification Search
CPC .... G06F 40/40; G06F 16/313; G06F 16/3329; G06F 16/3344; G06F 16/3347;
(Continued)

(56) References Cited

U.S. PATENT DOCUMENTS 8,046,368 B2 10/2011 Ohi et al.
9,336,485 B2 * 5/2016 Haggar ............... G06F 16/3344
(Continued)

FOREIGN PATENT DOCUMENTS

JP 2004178490 A 6/2004
JP 2006350989 A 12/2006
(Continued)

OTHER PUBLICATIONS

Soumia Lilia Berrahou et al. 'How to Extract Unit of Measure in Scientific Documents?', Conference: Proceedings of KDIR'13 (International Conference on Knowledge Discovery and Information Retrieval), Aug. 6, 2014 [retrieved o n Sep. 28, 2020]. Retrieved from <URL: http://www.researchgate.net/publication/256292768_How_to_extract_unit_of_measure_in_scientific_documents>pp. 2-9.
(Continued)

*Primary Examiner* — Linda Wong
(74) *Attorney, Agent, or Firm* — Dinsmore & Shohl LLP

(57) ABSTRACT

A method for performing a search for a result set of documents comprises receiving, at a computing device, an electronic document, identifying a numerical value in the document, extracting the numerical value and a portion of text surrounding the numerical value from the document to obtain extracted text, creating a vector representation of the extracted text, generating a series of questions associated with the extracted text, generating answers to the series of questions based on the vector representation of the extracted text, determining a context associated with the numerical value based on the answers to the plurality of questions, and storing the numerical value and the context associated with the numerical value in a database.

20 Claims, 5 Drawing Sheets

(51) Int. Cl.
    *G06F 16/33*    (2019.01)
    *G06F 16/31*    (2019.01)
(58) Field of Classification Search
    CPC ...... G06F 40/284; G06F 40/295; G06F 40/30;
                                            G06F 40/35
    See application file for complete search history.

(56) References Cited

U.S. PATENT DOCUMENTS

| | | | |
|---|---|---|---|
| 2005/0198027 A1 | 9/2005 | Hamaguchi | |
| 2018/0267960 A1* | 9/2018 | Rajendran | G06V 30/412 |
| 2018/0276462 A1 | 9/2018 | Davis et al. | |
| 2018/0285446 A1* | 10/2018 | Baughman | G06F 40/242 |
| 2019/0138804 A1 | 5/2019 | Suzuki et al. | |
| 2020/0279018 A1* | 9/2020 | Hamashita | G06F 40/58 |

FOREIGN PATENT DOCUMENTS

| | | |
|---|---|---|
| JP | 2010117797 A | 5/2010 |
| KR | 1020110081194 A | 7/2011 |

OTHER PUBLICATIONS

Notification of Transmittal of The International Search Report and The Written Opinion of the International Searching Authority, or the Declaration for PCT/US2020/040585, dated Oct. 15, 2020.

Helena F. Deus, Corey A. Harper, Darin McBeath, and Ron Daniel. Combining pattern matching with word embeddings for the extraction of experimental variables from scientific literature. 2017 IEEE International Conference on Big Data (Big Data), pp. 4287-4292, 2017.

Luca Foppiano, Laurent Romary, Masashi Ishii, and Mikiko Tanifuji. Automatic identification and normalization of physical measurements in scientific literature. Proceedings of the ACM Symposium on Document Engineering, DocEng 2019, pp. 0-4, 2019.

Tianyong Hao, Hongfang Liu, and Chunhua Weng. Valx: A system for extracting and structuring numeric lab test comparison statements from text. Methods of information in medicine, 55, Mar. 2016.

Omer Levy, Minjoon Seo, Eunsol Choi, and Luke Zettlemoyer. Zero-shot relation extraction via reading comprehension. CoNLL 2017—21st Conference on Computational Natural Language Learning, Proceedings, pp. 333-342, 2017.

Peng Qi, Xiaowen Lin, Leo Mehr, Zijian Wang, and Christopher D. Manning. Answering Complex Open-domain Questions Through Iterative Query Generation. 2019. Available at: <http://arxiv.org/abs/1910.07000>.

Kyle Hundman and Chris A. Mattmann. Measurement Context Extraction from Text: Discovering Opportunities and Gaps in Earth Science. 23rd ACM SIGKDD International Conference on Knowledge Discovery and Data Mining, Data-Driven Discovery Workshop, Halifax, Canada, Aug. 2017. Available at: https://arxiv.org/pdf/1710.04312.pdf.

* cited by examiner

| ANNOTATION COMPONENT | TURN | QUESTION | ANSWER |
|---|---|---|---|
| QUANTITY | N/A | N/A | 175 ml |
| MEASURED PROPERTY | FIRST TURN | "WHAT WAS 175 ml?" | VOLUME |
| MEASURED ENTITY | SECOND TURN | "WHAT HAD A VOLUME OF 175 ml?" | THE COFFEE CUP |
| QUALIFIER | THIRD TURN | "UNDER WHAT CONDITIONS DID THE COFFEE CUP HAVE A VOLUME OF 175 ml?" | AFTER I DRANK SOME COFFEE |

FIG. 5 ically relates to information retrieval and, more specifically, to systems and methods to extract the context of scientific measurements using targeted question answering.
SYSTEMS AND METHODS TO EXTRACT THE CONTEXT OF SCIENTIFIC MEASUREMENTS USING TARGETED QUESTION ANSWERING

CROSS REFERENCE TO RELATED APPLICATIONS

This application claims priority to U.S. Provisional Application No. 62/870,951, filed Jul. 5, 2019, the entire contents of which is hereby incorporated by reference.

FIELD

The present specification generally relates to information retrieval and, more specifically, to systems and methods to extract the context of scientific measurements using targeted question answering.

BACKGROUND

Measurement values and data points are often reported in scientific literature, such as journal articles. These measurements may relate to a variety of entities or properties being measured. Certain databases exist that collect or aggregate articles from scientific literature. However, these databases are typically curated manually and typically do not include context information associated with measured values to quickly understand their meaning or value. It may be desirable for a user to be able to access a database of measured values found in scientific literature relating to a certain topic. Accordingly, a need exists for a method of extracting the context of scientific measurements.

SUMMARY

In an embodiment, a method includes receiving an electronic document, identifying a numerical value in the document, extracting the numerical value and a portion of text surrounding the numerical value from the document to obtain extracted text, creating a vector representation of the extracted text, generating a series of questions associated with the extracted text, generating answers to the series of questions based on the vector representation of the extracted text, determining a context associated with the numerical value based on the answers to the plurality of questions, and storing the numerical value and the context associated with the numerical value in a database.

In an embodiment, a system includes a processing device and a non-transitory, processor-readable storage medium including one or more programming instructions stored thereon. When executed, the instructions cause the processing device to receive an electronic document, identify a numerical value in the document, extract the numerical value and a portion of text surrounding the numerical value from the document to obtain extracted text, create a vector representation of the extracted text, generate a series of questions associated with the extracted text, generate answers to the series of questions based on the vector representation of the extracted text, determine a context associated with the numerical value based on the answers to the series of questions, and store the numerical value and the context associated with the numerical value.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 5 depicts an example of a multi-turn question answering according to one or more embodiments shown and described herein.

DETAILED DESCRIPTION

Referring generally to the figures, embodiments described herein are directed to systems and methods to extract the context of scientific measurements using targeted question answering. Scientific literature, such as journal articles, textbooks, and the like, often include a variety of measured values of various entities associated with the literature. For example, a journal article may discuss research results and may include certain measured quantities or values associated with the research. The journal article may contain a discussion of the measured values (e.g., what the measured values represent, how they were obtained, etc.). By reading the journal article and the context around the measured values, a reader may learn information about the measured values. However, it may be desirable for a system to automatically extract measured values from a journal article and determine the context of the measured values that may be presented to a user. The user may then quickly learn about the measured values contained in the journal article without having to read the journal article itself. Furthermore, by extracting context from measured values contained in a variety of journal articles or other scientific literature, a database may be created aggregating measured values from a large corpus of scientific literature. The database may then be searched by a user interested in learning about a particular topic associated with particular measured values.

In the embodiments disclosed herein, a system may scan a journal article or other scientific literature to detect numerical values or quantities contained therein. These numerical values may represent scientific measurements. The system may then extract a portion of text (e.g., a sentence, a paragraph, or the like) surrounding each numerical value detected. The extracted text may then be encoded or mapped to a vector representation and the vector representation of the text may be analyzed using multi-turn question answering to learn the context of each numerical value. The system may then output a list containing each numerical value detected in a document and the context associated with each value.

The system may further perform these functions for a plurality of articles or other document in a corpus. For each document in the corpus, the system may output a list containing the numerical values contained therein and the context associated with the numerical values. This may then be aggregated into a database containing data associated with numerical quantities and the context of those numerical quantities across the entire corpus of documents. The database may then be searched by a user.

Figure 1:
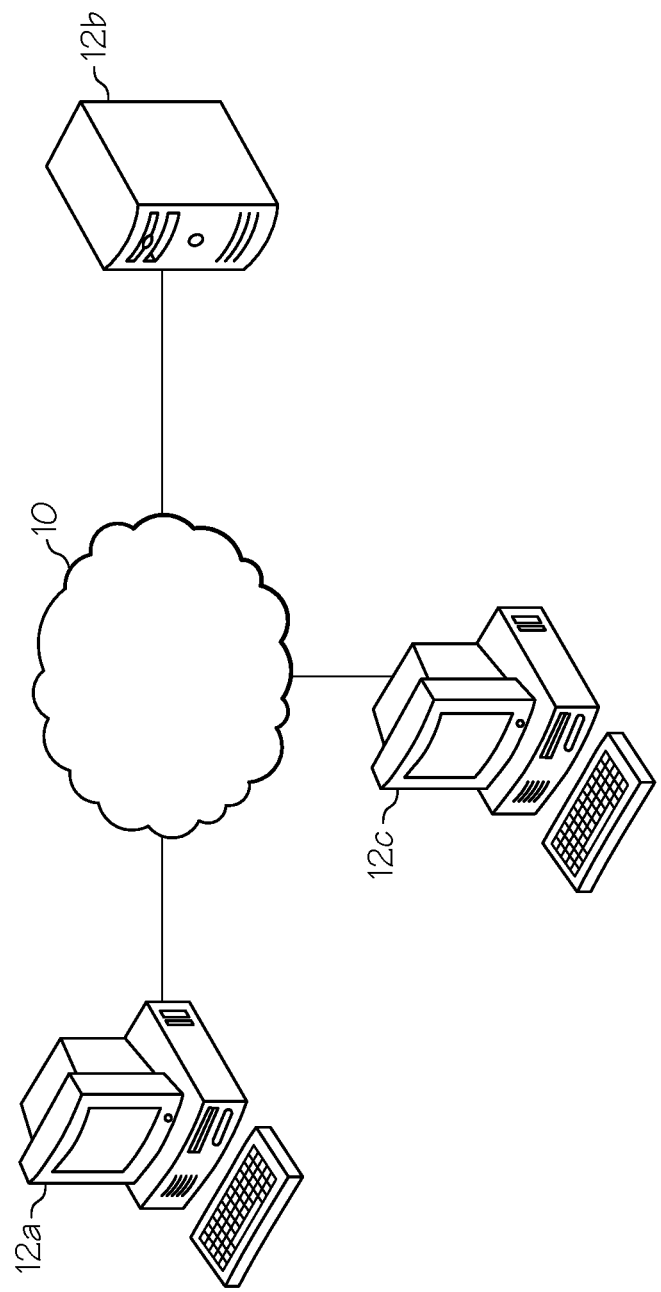
FIG. 1 schematically depicts an illustrative computing network for a system for extracting the context of scientific measurements using targeted question answering according to one or more embodiments shown and described herein.

Referring now to the drawings, FIG. 1 depicts an illustrative computing network, illustrating components of a system for performing the functions described herein, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to facilitate searching of a database of measured values described herein, display and receive input from a graphical user interface used to perform such searching, and display a result set of such searching. The user computing device 12a may also be utilized to perform other user functions.

The administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents (e.g., electronic documents) into a document database.

The server computing device 12b may receive a search query from the user computing device 12a and may perform a search of a database of measured values to identify a result set of measured values and/or documents related to the query using the techniques disclosed herein. After performing the search and identifying the result set, the server computing device 12b may transmit the result set to the user computing device 12a such that the user computing device 12a may display the result set. The components and functionality of the server computing device 12b will be set forth in detail below.

It should be understood that while the user computing device 12a and the administrator computing device 12c are depicted as personal computers and the server computing device 12b is depicted as a server, these are non-limiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, the server computing device 12b, and the administrator computing device 12c may represent a plurality of computers, servers, databases, etc.

Figure 2:
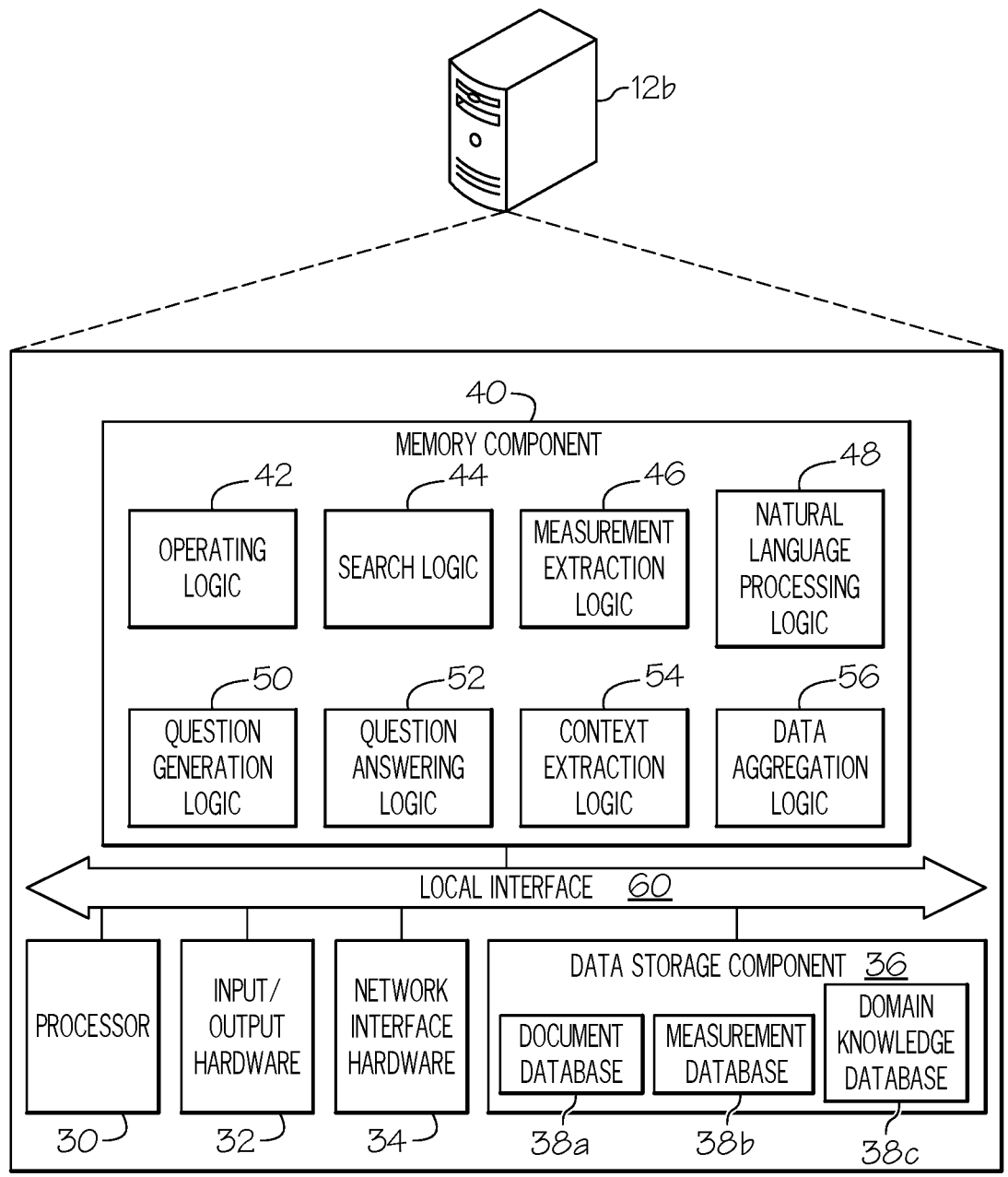
FIG. 2 schematically depicts the server computing device from FIG. 1, further illustrating hardware and software that may be used in extracting the context of scientific measurements using targeted question answering according to one or more embodiments shown and described herein.

FIG. 2 depicts additional details regarding the server computing device 12b from FIG. 1. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store a document database 38a, a measurement database 38b, and a domain information database 38c), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, search logic 44, measurement extraction logic 46, natural language processing logic 48, question generation logic 50, question answering logic 52, context extraction logic 54, and data aggregation logic 56 (each of which may be embodied as a computer program, firmware, or hardware, as an example). A local interface 60 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store the document database 38a, the measurement database 38b, and the domain information database 38c. In embodiments, the document database 38a includes a corpus of documents (e.g., electronic documents) to be analyzed using the techniques herein. In the illustrated embodiments, the document database 38a comprises scientific literature (e.g., journal articles, textbooks, and the like). However, it should be understood that in some examples, the document database 38a may contain other types of documents (e.g., patents, geological surveys, engineering white papers, corporate archives, and the like). In embodiments, the text of the documents in the document database 38*a* comprise one or more numerical values (e.g., measured values) to be analyzed using the techniques described herein. In some examples, the document database 38*a* may comprise documents associated with a certain scientific field (e.g., cancer research, material science, environmental science, etc.). In other examples, the document database 38*a* may comprise documents associated with a variety of scientific fields. Documents to be analyzed by the server computing device 12*b* may be added to the document database 38*a* for analysis.

The measurement database 38*b* may comprise a database of measurements contained in documents in the document database 38*a* and associated context. The measurement database 38*b* may be generated by the server computing device 12*b* using the techniques described herein. Additional details of the measurement database 38*b* is discussed below.

The domain information database 38*c* may comprise data or information associated with one or more domains or subject areas associated with the documents in the document database 38*a*. Additional details of the domain information database 38*c* are discussed below. Other data may be stored in the data storage component 36 to provide support for functionalities described herein.

Included in the memory component 40 are the operating logic 42, the search logic 44, the measurement extraction logic 46, the natural language processing logic 48, the question generation logic 50, the question answering logic 52, the context extraction logic 54, and the data aggregation logic 56. The operating logic 42 may include an operating system and/or other software for managing components of the server computing device 12*b*. Similarly, the search logic 44 may reside in the memory component 40 and may be configured to search the measurement database 38*b* based on queries received from the user computing device 12*a*. The search logic 44 is discussed in further detail below.

The measurement extraction logic 46 may extract numerical values from documents in the document database 38*a*. In particular, the measurement extraction logic 46 may analyze the text of a document in the document database 38*a* and identify all numerical values (e.g., measurement values) contained in the document. The measurement extraction logic 46 may then extract these numerical values along with some amount of text surrounding the numerical value in the document. The text surrounding an extracted measurement may be used to determine the context of the measurement, as discussed herein.

In one example, the measurement extraction logic 46 may extract the sentence that contains a numerical value. In another example, the measurement extraction logic 46 may extract the paragraph that contains a numerical value. In other examples, the measurement extraction logic 46 may extract other amounts of text surrounding a numerical value in a document. The text surrounding an extracted measurement may be used to determine the context of the measurement, as discussed herein.

In some examples, the measurement extraction logic 46 may extract a numerical value and an associated unit (e.g., 10 mm, 300 kg) associated with a measurement from a document. In other examples, the measurement extraction logic 46 may extract additional information or metadata associated with a measurement including a value, a unit, tolerances, standard deviations, and flags denoting approximations or whether a value is a mean or median or other statistical measurement. In other examples, the measurement extraction logic 46 may extract other features associated with a measurement. In some examples, the domain information database 38*c* may contain a list of a large number of known units of measure (e.g., units of measured cataloged by the National Information Standards Organization). In these examples, the measurement extraction logic 46 may identify units of measure in a document in the document database 38*a* by identifying instances of the units of measure in the domain information database 38*c* that are contained in the document (e.g., by performing pattern matching). In some examples, the domain information database 38*c* may include target contexts, properties, and entity types that may help tune the extraction performed by the measurement extraction logic 46 to a particular use case.

After the measurement extraction logic 46 extracts measurement values and surrounding text from a document, the natural language processing logic 48 may input the extracted measurement values and surrounding text into a natural language processing algorithm. Accordingly, the natural language processing logic 48 may map or encode the extracted measurement values and text into a numerical vector representation. A natural language processing algorithm may be a deep neural network that has been trained on a large data set to understand patterns that typically occur in the way people use language. In one example, the natural language processing logic 48 may utilize the Bidirectional Encoder Representations from Transformers (BERT) algorithm to encode the extracted text. However, it should be understood that in other examples, the natural language processing logic 48 may utilize other natural language processing algorithms.

Once the natural language processing logic 48 encodes the extracted text into a vector representation, mathematical or other operations may be performed on the vector representation of the text. In particular, the question answering logic 52 may utilize question answering (QA) techniques to learn about the context of a measurement from extracted text, as described herein. QA techniques or QA models comprise methods of asking a question associated with a portion of text and receiving an answer based on the portion of text. A QA model may be trained on a generic data set to answer questions about a portion of text based solely on the structure and language of the text. That is, the QA model need not have any special knowledge about the subject matter of the text. One example of a QA model that may be used by the natural language processing logic 48 is an extractive model trained on the Stanford Question Answering Dataset (SQuAD), which draws questions from Wikipedia and may be used to train QA models. Other examples may include generative or extractive models trained on SQuAD or other datasets, as well as other rules based or machine learning QA methods.

The question answering logic 52 may use a QA model to pose questions and receive answers related to vector representation of the text extracted by the measurement extraction logic 46. In some examples, the question answering logic 52 uses SQuAD. However, it should be understood that in other examples, the question answering logic 52 may utilize any other QA model or any combination of QA models.

The question generation logic 50 may generate questions about extracted text to pose to the question answering logic 52. The question answering logic 52 may then utilize a QA model (e.g., a model trained on SQuAD) to return answer to the posed questions. In particular, the question generation logic 50 may generate a series of questions to determine the context of a measurement extracted by the measurement extraction logic 46. Thus, the question generation logic 50 and the question answering logic 52 may utilize multi-turn question answering, wherein a series of questions are asked over a series of turns and the output to each question may be used as part of the text of subsequent questions, as described herein. In some examples, the question answering logic 52 may generate questions following a particular template, as discussed below in connection with FIG. 5.

Figure 4:
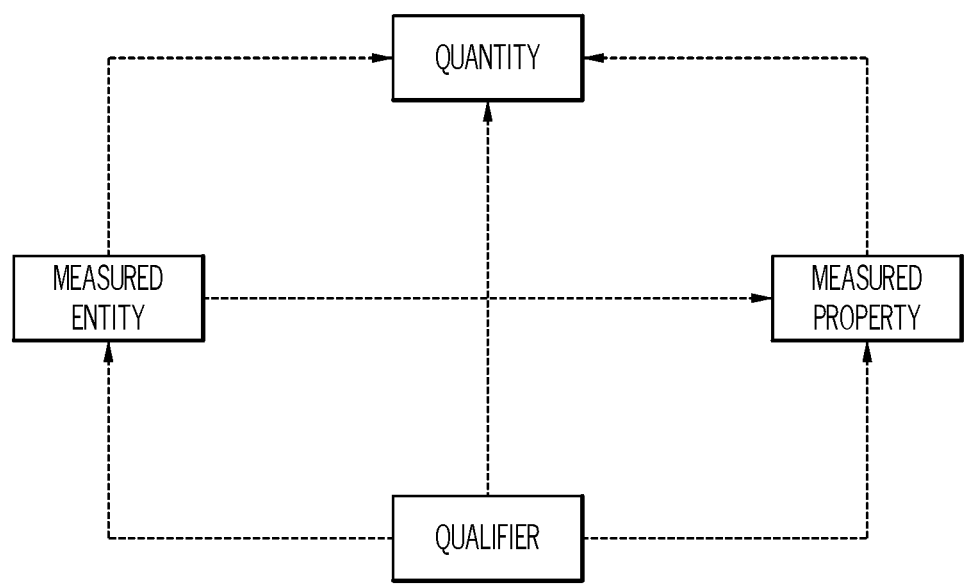
FIG. 4 depicts an illustrative an exemplary context of a measurement according to one or more embodiments shown and described herein.

In one example, the server computing device 12b determines a context associated with a measurement comprising four values. As shown in FIG. 4, these four values comprise a quantity, a measured entity, a measured property, and a qualifier. The quantity identifies the particular value that was measured and associated unit of a measurement extracted from a document (e.g., 10 mm). The measured property identifies what property was measured (e.g., length). The measured entity identifies the entity that had the measured value of the property (e.g., a lesion that was measured to be 10 mm). Lastly, the qualifier identifies under what conditions the measurement was taken (e.g., from a 40-year old male patient). In other examples, the context for an extracted measurement may comprises different or additional values.

Referring back to FIG. 2, in the illustrated example, the question generation logic 50 generates a series of questions to be posed to the question answering logic 52 to determine the context values described in FIG. 4. FIG. 5 shows an example multi-turn question sequence for the sentence, "After I drank some coffee, the coffee cup's remaining volume was 175 ml." Initially, the measurement extraction logic 46 identifies "175 ml" from a document and extracts that sentence. Thus, as shown in FIG. 5, the quantity for this measurement is 175 ml. Next, on the first turn, the question generation logic 50 generates the question, "what was 175 ml?" The question answering logic 52 then returns, "volume", which becomes the measured property. On the second turn, the question generation logic 50 generates the question, "what had a volume of 175 ml?" The question answering logic 52 then returns, "the coffee cup", which becomes the measured entity. On the third turn, the question generation logic 50 generates the question, "under what conditions did the coffee cup have a volume of 175 ml?" The question answering logic 52 then returns, "after I drank some coffee", which becomes the qualifier. In the example of FIG. 5, the question answering logic 52 generates three questions following a particular template to be asked during three turns. The first question incorporates the detected measurement and the second and third question each incorporate the answer to a question from a previous turn. However, in other examples, a different template may be used.

As discussed above, and shown in the example of FIG. 5, the question generation logic 50 and the question answering logic 52 are able to use multi-turn QA to determine information or context about a measurement extracted by the measurement extraction logic 46. The multi-turn QA begins with the numerical value of an extracted measurement and asks a series of questions to determine the context of the measurement (e.g., the measured property, the measured entity, and the qualifier). Each answer provided by the question answering logic 52 may be used by the question generation logic 50 to formulate the next question. As such, after a series of questions are asked by the question generation logic 50 and answered by the question answering logic 52, the context of the measurement is determined. The context extraction logic 54 may then extract the context of the measurement based on the answers generated by the question answering logic 52. In the illustrated example, the context extraction logic 54 extracts the quantity, the measured entity, the measured property, and the qualifier associated with a measurement, as shown in FIG. 4. However, in other examples, the context extraction logic 54 may extract other context information related to a measurement. After the context extraction logic 54 extracts the context of the measurement, the measurement, the associated context, and a reference to the document from which the measurement was extracted may be stored in the measurement database 38b.

It should be noted that the QA model used by the question answering logic 52 may not have any subject matter or domain knowledge related to the documents in the document database 38a. That is, while the documents in the document database 38a may come from scientific literature, the QA model used by the question answering logic 52 is typically not trained on scientific literature. Instead, the QA model is simply trained to understand the structure of language and to answer questions based on the semantics implicit in the vector representation of a portion of text. For example, SQuAD draws questions from Wikipedia and may be used to train a QA model.

Furthermore, in some examples, the question generation logic 50 may generate questions without using any subject matter knowledge. For example, the questions shown in FIG. 5 do not utilize any particular scientific knowledge, but rather follow a template based solely on the extracted measurement value and subsequent answers to questions. Alternatively, in some examples, the question generation logic 50 may utilize subject matter or domain knowledge when generating one or more of the questions to pose to the question answering logic 52. In these examples, the question generation logic 50 may access the domain information database 38c and generate one or more questions based on information contained therein. For example, a series of QA turns may reveal that a measurement of 97° C. is a boiling point of water. The question generation logic 50 may then access the domain information database 38c and determine that the normal boiling point of water is 100° C. Accordingly, the question generation logic 50 may generate one or more additional questions based on this discrepancy. For example, the question generation logic 50 may ask the question answering logic 52 where the boiling point was measured to be 97° C. In response, the question answering logic 52 may answer that the measurement occurred at a particular altitude.

In another example, the question generation logic 50 may access the domain information database 38c to choose different terminology to use when generating questions. Some domains may utilize different terminology somewhat interchangeably. As such, an author of a particular document may use different words to describe a measurement than what the question generation logic 50 would normally expect. Accordingly, the question generation logic 50 may generate multiple formulations of a question using different terms to elicit a proper response. For example, a measurement may be related to a carcinoma. The domain information database 38c may know that a carcinoma is a type of cancer. Thus, the question generation logic 50 may generate one question asking about a property of a carcinoma and may generate another question asking about the same property of a cancer or other related terminology. As such, generating multiple formulations of a question based on the information in the domain information database 38c may make it more likely that the question answering logic 52 will return a desired response. The context extraction logic 54 may then use probabilistic techniques to determine the proper context of a measurement based on the answers returned by the question answering logic 52 to each of the formulations of one or more questions posed by the question generation logic 50.

Referring back to FIG. 2, the data aggregation logic 56 may aggregate data extracted by the context extraction logic 54. The data aggregation logic 56 may aggregate data relating to multiple measurements extracted from a single document as well as measurements extracted from multiple documents in the document database 38a. The data aggregation logic 56 may perform the data aggregation by accessing extracted measurements and related content from the measurement database 38b. In some examples, the data aggregation logic 56 may aggregate data from different domains or subject matters separately. For example, the data aggregation logic 56 may aggregate all measurements related to cancer research and may separately aggregate all measurements related to materials science.

The data aggregation logic 56 may then present aggregated data in a user interface that may be accessed by the user computing device 12a. The user interface created by the data aggregation logic 56 may allow users access to a summary of the extracted measurements and related content across all the documents in the document database 38a. In one example, the data aggregation logic 56 may generate a table of measurements and associated context for each measurement along with links to the document from which each measurement was extracted. Thus, a user may use the user interface to view different measurements and when the user finds a particular measurement of interest, the user may click on the link to the document. The user may then either be given a citation to the appropriate document or may be shown a copy of the document directly. In some examples, the data aggregation logic 56 may filter or otherwise help search the corpus of documents in the document database 38a for additional documents containing similar measurements to an initial document, or to recommend related documents from the document database 38a.

In one example, a user may utilize the user interface to search the measurement database 38b. As such, when a search request is received from the user computing device 12a, the search logic 44 may perform a search of the measurement database 38b based on the search request. In some examples, a search request may include one or more of a quantity, a measured entity, a measured property, and/or a qualifier associated with a measurement. For example, a user may search for lung cancer tumor with a size of between 5 cm and 8 cm. The search logic 44 may then search the measurement database 38b for any measurements that have a quantity between 5 cm and 8 cm, a measured property of size, and a measured entity of lung cancer tumor. The search logic 44 may then present the results of the search the user. The user may then review the various measurements and the associated context and if any measurements are of interest, the user may click on the link to access the documents (e.g., journal articles) from which the measurements of interest were extracted. As such, the user may quickly search scientific literature based on measurement data, which may enhance the utility of such scientific literature. For example, a doctor or researcher treating a cancer patient with a tumor having a certain size or other properties may search the measurement database 38b for measurements having similar properties. As such, the doctor or researcher may find a journal article discussing other similar cases that may discuss treatment options that may be of use for the patient.

The data aggregation logic 56 may present aggregated measurements in a variety of forms or user interfaces. In one example, the data aggregation logic 56 may present aggregated measurements in the form of a knowledge graph. In another example, if a collection of measurements are related to geographic locations, the aggregated data may be presented in the form of a map showing locations on the map of associated measurements. In other examples, aggregated data may be presented in different types of graphs or charts (e.g., a bubble chart). In some examples, such graphs or charts may summarize numerical values across the data aggregated by the data aggregation logic 56 based on statistical characteristics (e.g., a mean or a median) of a measurement value for a particular entity type or property type.

In some examples, the data aggregation logic 56 may present a user interface that allows a user to move back and forth between aggregated data and associated documents. For example, a user may be presented with a list of measurements along with their associated contexts and a link to the documents from which the measurements were extracted. The user may click on a particular document and may be presented with that document. The user may then have the option of clicking on a particular button or location in the user interface to return to the list of measurements and continue browsing.

It should be understood that the components illustrated in FIG. 2 are merely illustrative and are not intended to limit the scope of this disclosure. More specifically, while the components in FIG. 2 are illustrated as residing within the server computing device 12b, this is a non-limiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

As mentioned above, the various components described with respect to FIG. 2 may be used to carry out one or more processes and/or provide functionality for extracting the context of scientific measurements using targeted question answering. An illustrative example of the various processes is described with respect to FIG. 3. Although the steps associated with the blocks of FIG. 3 will be described as being separate tasks, in other embodiments, the blocks may be combined or omitted. Further, while the steps associated with the blocks of FIG. 3 will be described as being performed in a particular order, in other embodiments, the steps may be performed in a different order.

At step 300, the server computing device 12b receives an electronic document to be analyzed. The document may comprise a journal article or other scientific literature. The document may be stored in the document database 38a.

At step 302, the measurement extraction logic 46 identifies a numerical value in the document. The numerical value may be associated with a scientific measurement. The measurement extraction logic 46 may also identify a unit of measurement associated with the scientific measurement. The measurement extraction logic 46 may also identify a tolerance or standard deviation associated with the scientific measurement. The measurement extraction logic 46 may also identify other metadata associated with the scientific measurements (e.g., whether a measurement is a mean value or an approximation).

At step 304, the measurement extraction logic 46 extracts the numerical value and a portion of text surrounding the numerical value from the document to obtain extracted text. The portion of text extracted from the document may comprise the sentence containing the numerical value, or the paragraph containing the numerical value, or some other quantity of text surrounding the numerical value.

At step 306, the natural language processing logic 48 creates a vector representation of the extracted text. The natural language processing logic 48 may create a vector representation of the extracted text using a natural language processing algorithm such as BERT.

At step 308, the question generation logic 50 generates a question associated with the extracted text. In some examples, the question generation logic 50 identifies a subject matter of the extracted text and generates the question based at least in part on the subject matter. In other examples, the question generation logic 50 may be based on a generative machine learning model that creates questions based on the text or based on the text and knowledge about the subject matter.

At step 310, the question answering logic 52 generates an answer to the question based on the extracted text. The question answering logic 52 may generate the answer to the question based on a question answering model. In one example, the question answering logic 52 utilizes a question answering model based in part on SQuAD.

At step 312, the context extraction logic 54 determines whether the context of the numerical value can be determined based on the questions that have been answered by the question answering logic 52. The context of the numerical value may include a property of an entity that was measured, the entity whose property was measured, and conditions under which a scientific measurement was taken.

If the context extraction logic 54 is able to determine the context of the numerical value (yes, at step 312), then at step 314, the context extraction logic 54 determines the context associated with the numerical value based on the answers generated by the question answering logic 52. If the context extraction logic 54 is not able to determine the context of the numerical value (no at step 312), then control returns to step 308 and the question generation logic 50 generates an additional question. The additional question generated by the question generation logic 50 may be based on the answer to the previous question generated by the question answering logic 52.

At step 316, the context extraction logic 54 stores the numerical value and the context associated with the numerical value in the measurement database 38b. The numerical value and the context may be stored in a data structure comprising a quantity to hold the numerical value, a measured entity to hold the entity that was measured, a measured property to hold the property of the entity that was measured, and a qualifier to hold the conditions under which the measurement was taken, as shown in FIG. 4.

Figure 3:
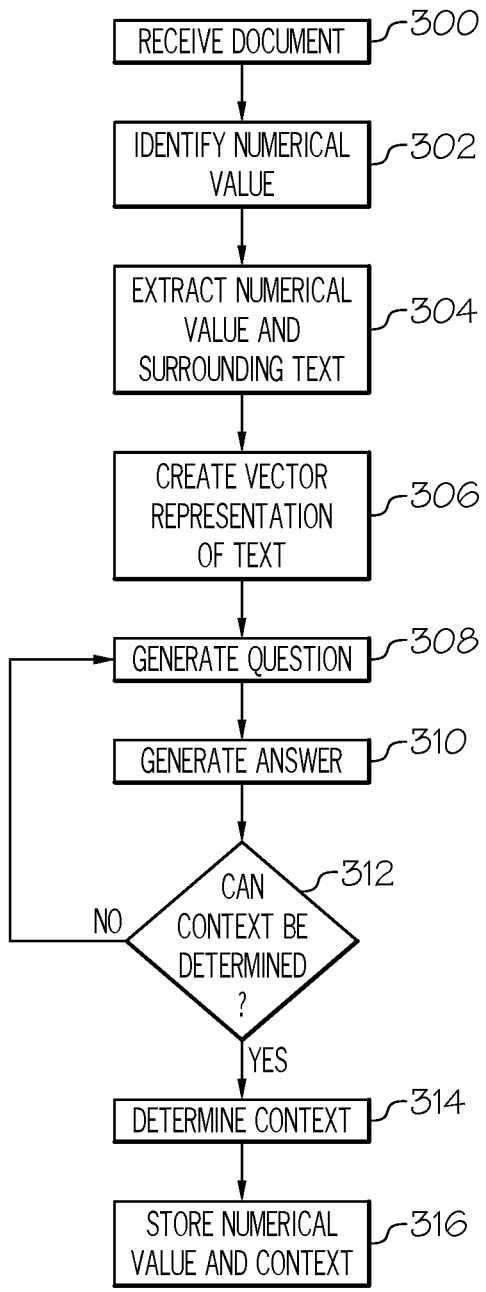
FIG. 3 depicts a flow diagram of an illustrative method of extracting the context of scientific measurements using targeted question answering according to one or more embodiments shown and described herein.

The method of FIG. 3 may be performed for each numerical quantity in a document and for each document in the document database 38a. After the method of FIG. 3 is performed for one or more documents, the data aggregation logic 56 may aggregate the extracted numerical values and associated context to create an aggregated data set. The aggregated data set may then be presented to a user.

It should be understood that embodiments described herein are directed to systems and methods for extracting the context of scientific measurements using targeted question answering. One or more documents of scientific literature may be analyzed and numerical values may be identified in the documents. The numerical values may be extracted from the documents along with some amount of text surrounding the numerical values. The extracted text may be encoded into a vector representation using a natural language processing algorithm. Multi-turn question answering may then be performed on the vector representation of the text, whereby a series of questions are asked about the text and a question answering model is used to answer the questions. The context of the numerical values including a quantity measured, a measured property, a measured entity, and conditions under which the quantity was measured may be determined based on the results of the multi-turn question answering. Data from multiple documents may be aggregated and presented to a user in a user interface that may be searched by the user. The user interface may present a list of measurements and associated context along with links to the documents from which the measurements were extracted.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    receiving, at a computing device, an electronic document;
    identifying a numerical value in the document;
    extracting the numerical value and a portion of text surrounding the numerical value from the document to obtain extracted text;
    inputting the extracted text into a trained neural network to create a vector representation of the extracted text;
    generating a series of questions associated with the extracted text;
    generating answers to the series of questions based on the vector representation of the extracted text;
    determining a context associated with the numerical value based on the answers to the series of questions; and
    storing the numerical value and the context associated with the numerical value in a database.

2. The method of claim 1, wherein the numerical value 1s associated with a scientific measurement.

3. The method of claim 2, wherein the context associated with the scientific measurement comprises a property of an entity that was measured, the entity whose property was measured, and conditions under which the scientific measurement was taken.

4. The method of claim 3, further comprising:
    storing the numerical value and the context associated with the numerical value in a data structure comprising a quantity to hold the numerical value, a measured entity to hold the entity whose property was measured, a measured property to hold the property of the entity that was measured, and a qualifier to hold the conditions under which the scientific measurement was taken.

5. The method of claim 2, further comprising:
    identifying a unit of measurement associated with the numerical value.

6. The method of claim 2, further comprising:
    identifying a tolerance associated with the numerical value.

7. The method of claim 2, further comprising:
    identifying a standard deviation associated with the numerical value.

8. The method of claim 1, further comprising:
    creating the vector representation of the extracted text using a natural language processing algorithm.

9. The method of claim 8, wherein the natural language processing algorithm comprises Bidirectional Encoder Representations from Transformers.

10. The method of claim 1, wherein at least one question of the series of questions is generated based on an answer to a previous question.

11. The method of claim 1, further comprising:
generating the answers to the series of questions based on a question answering model.

12. The method of claim 11, wherein the question answering model is based at least in part on the Stanford Question Answering Dataset.

13. The method of claim 1, further comprising:
identifying a subject matter of the extracted text; and
generating at least one question of the series of questions based at least in part on the subject matter.

14. The method of claim 1, further comprising:
aggregating the numerical value and the context associated with the numerical value with at least one other numerical value extracted from the document and a context associated with the at least one other numerical value to create an aggregated data set; and
presenting the aggregated data set to a user.

15. A system comprising:
a processing device; and
a non-transitory, processor-readable storage medium comprising one or more programming instructions stored thereon that, when executed, cause the processing device to:
receive an electronic document;
identify a numerical value in the document;
extract the numerical value and a portion of text surrounding the numerical value from the document to obtain extracted text;
input the extracted text into a trained neural network to create a vector representation of the extracted text;
generate a series of questions associated with the extracted text;
generate answers to the series of questions based on the vector representation of the extracted text;
determine a context associated with the numerical value based on the answers to the series of questions; and
store the numerical value and the context associated with the numerical value in a database.

16. The system of claim 15, wherein the instructions, when executed, cause the processing device to:
create the vector representation of the extracted text using a natural language processing algorithm.

17. The system of claim 15, wherein the instructions, when executed, cause the processing device to:
generate at least one question of the series of questions based on an answer to a previous questions.

18. The system of claim 15, wherein the instructions, when executed, cause the processing device to:
generate the answers to the series of questions based on a question answering model.

19. The system of claim 15, wherein the instructions, when executed, cause the processing device to:
identify a subject matter of the extracted text; and
generate at least one question of the series of questions based at least in part on the subject matter.

20. The system of claim 15, wherein the instructions, when executed, cause the processing device to:
aggregate the numerical value and the context associated with the numerical value with at least one other numerical value extracted from the document and a context associated with the at least one other numerical value to create an aggregated data set; and
present the aggregated data set to a user.

* * * * *